United States Patent
Langhammer

(10) Patent No.: US 7,302,460 B1
(45) Date of Patent: Nov. 27, 2007

(54) ARRANGEMENT OF 3-INPUT LUT'S TO IMPLEMENT 4:2 COMPRESSORS FOR MULTIPLE OPERAND ARITHMETIC

(75) Inventor: Martin Langhammer, Salisbury (GB)

(73) Assignee: Altera Corporation, San Jose, CA (US)

( * ) Notice: Subject to any disclaimer, the term of this patent is extended or adjusted under 35 U.S.C. 154(b) by 753 days.

(21) Appl. No.: 10/660,903

(22) Filed: Sep. 11, 2003

(51) Int. Cl.
*G06F 7/50* (2006.01)

(52) U.S. Cl. ...................................... 708/700

(58) Field of Classification Search ........ 708/700–714, 708/200; 326/4
See application file for complete search history.

(56) References Cited

U.S. PATENT DOCUMENTS

| | | | | |
|---|---|---|---|---|
| 4,228,520 A * | 10/1980 | Letteney et al. | ............ | 708/708 |
| 5,491,653 A * | 2/1996 | Taborn et al. | .............. | 708/708 |
| 5,499,203 A * | 3/1996 | Grundland | ................... | 708/710 |
| 5,761,099 A * | 6/1998 | Pedersen | ..................... | 708/706 |
| 5,815,003 A * | 9/1998 | Pedersen | ..................... | 326/39 |
| 5,898,602 A * | 4/1999 | Rothman et al. | ........... | 708/707 |
| 6,066,960 A * | 5/2000 | Pedersen | ..................... | 326/39 |
| 6,317,771 B1 * | 11/2001 | Langhammer | .............. | 708/655 |
| 6,369,610 B1 * | 4/2002 | Cheung et al. | ............. | 708/670 |
| 6,407,576 B1 * | 6/2002 | Ngai et al. | ..................... | 326/41 |
| 6,584,485 B1 * | 6/2003 | Aoki et al. | .................. | 708/708 |
| 6,897,679 B2 * | 5/2005 | Cliff et al. | ..................... | 326/41 |
| 6,943,580 B2 * | 9/2005 | Lewis et al. | .................. | 326/40 |
| 2002/0129077 A1 * | 9/2002 | Rhee | .......................... | 708/708 |
| 2003/0163504 A1 * | 8/2003 | Knowles | ..................... | 708/708 |

OTHER PUBLICATIONS

Heriot-Watts, User Configurable Logic, Sep. 1992, IEEE computing & Control Engineering Journal, pp. 205-213.*

* cited by examiner

*Primary Examiner*—Chat C. Do
(74) *Attorney, Agent, or Firm*—Beyer Weaver LLP

(57) ABSTRACT

A programmable logic device (PLD) includes a plurality of logic array blocks (LAB's) connected by a PLD routing architecture. At least one LAB is configured to determine a compression of a plurality of N-bit numbers. The LAB includes look-up table (LUT) logic cells. Each look-up table (LUT) logic cell is configured to input three operand signals at three respective inputs of that look-up table (LUT) logic cell and to output two signals at two respective outputs of that look-up table logic cell (LUT) that are a sum and carry signal resulting from adding the three input signals. By employing 3:2 compressor LUT logic cells within the LAB for addition, the use of the routing resources in the PLD is minimized.

3 Claims, 3 Drawing Sheets

ARRANGEMENT OF 3-INPUT LUT'S TO IMPLEMENT 4:2 COMPRESSORS FOR MULTIPLE OPERAND ARITHMETIC

TECHNICAL FIELD AND BACKGROUND

The present invention is in the field of adding 4:2 compressors functions to programmable logic devices. In particular, the present invention arranges 3:2 compressors to form 4:2 compressors, while both allowing the use of the arithmetic capabilities of the compressors, and also logic combinations that can be implemented by 3:1, 3:2, 4:1, and 4:2 LUT (look up tables).

In one conventional arrangement, to add together multiple operands, the operands are added together two at a time, in a so-called adder tree. For example, to add together four operands using such an arrangement, two of the operands are added together to obtain a first intermediate result, and the other two operands are added together to obtain a second intermediate result. Then the first and second intermediate results are added together to obtain a final result. Typically, in this arrangement, a ripple carry adder or a carry propagate adder is used for each addition. In a ripple carry or carry propagate adder, two numbers in binary form are added together, with one number as a result. Most programmable logic architectures support ripple carry addition for adder trees, as the number of inputs and outputs between the local logic and global routing architecture is relatively small. (2 inputs, 1 output per result bit). Also, most programmable logic architectures have a n−1 logic cell structure. (3 or 4 inputs, 1 output bit).

In another conventional arrangement, in an initial step, three of the four operands are added together bitwise using a carry-save adder. The resulting sum and carry for each bit are provided to a second stage carry-save adder which adds in the fourth of the four operands and generates a sum and carry bit for each operand. Finally, a carry-propagate adder adds together the sum and carry result bits from the second stage carry-save adder to generate the sum of the four operands. However, 3:2 compressors are inefficient when implemented using PLD architectures. That is, because of the two outputs, two LUTs are burned per level. 4:2 compressors are more efficient, because they have the same routing density of ripple carry adders (2:1 input/output ratio).

However, routing must be provided between the 3:2 compressors (which is inefficient in PLDs) to build a 4:2 compressor.

BRIEF SUMMARY

In accordance with an aspect of the invention, a programmable logic device (PLD) includes a plurality of logic array blocks (LAB's) connected by a PLD routing architecture. At least one LAB is configured to determine a compression of a plurality of N-bit numbers. The LAB includes look-up table (LUT) logic cells. Each look-up table (LUT) logic cell is configured to input three signals at three respective inputs of that look-up table (LUT) logic cell and to output two signals at two respective outputs of that look-up table logic cell (LUT) that are a sum and carry signal resulting from adding the three input signals. Input lines are configured to receive input signals from the PLD routing architecture that represent the plurality of N-bit numbers and output lines configured to provide output signals to the PLD routing architecture that represent the compression of the plurality of N-bit numbers.

LAB internal routing logic connecting the LUT logic cells such that the LUT logic cells collectively process the input signals, received at the input lines, that represent the N-bit numbers to generate the output signals, provided at the output lines, that represent the sum of the N-bit numbers. The LAB internal routing logic is not part of the routing architecture of the PLD.

By employing 3:2 compressor LUT logic cells within the LAB, the use of the routing architecture of the PLD is minimized, which contributes to more efficient use of the PLD resources.

BRIEF DESCRIPTION OF THE DRAWING(S)

DETAILED DESCRIPTION

Before describing an example, we initially note that 3:2 compressors, and building 4:2 compressor structures out of 3:2 compressors is well known. In a broad aspect, the invention includes generic programmable logic structures containing 3:1 and 4:1 LUT functions, with particular inter-LUT routing and particular arrangement to accomplish 4:2 compressors as well.

Figure 1:
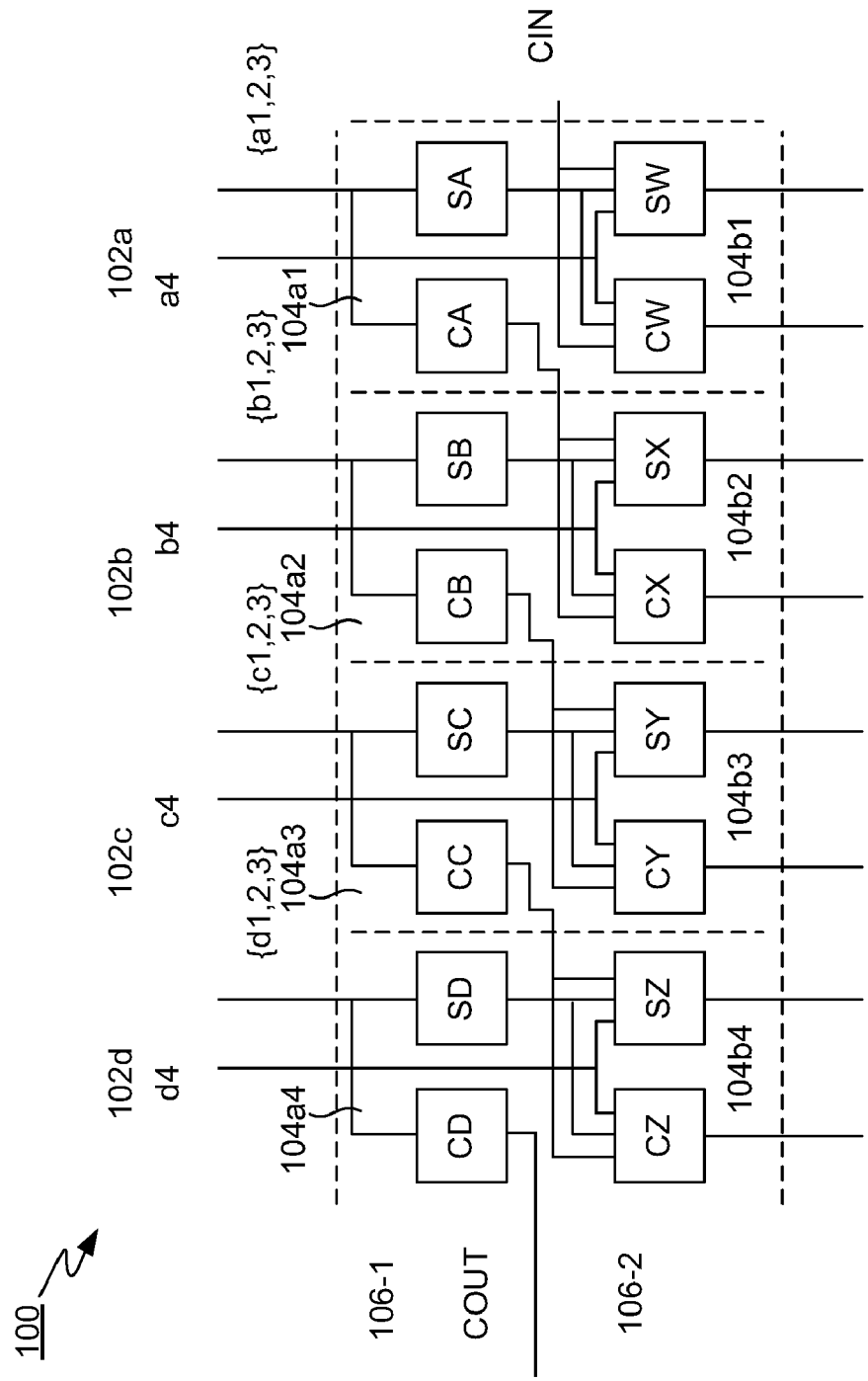
FIG. 1 illustrates an example logic array block in accordance with an aspect of the invention, to add together four 4-bit operands.

Turning now to FIG. 1, an example logic array block (LAB) 100 of a programmable logic device is illustrated. As is discussed in greater detail below, the LAB 100 comprises a plurality of three-input look-up table (LUT) circuits connected such that the LAB 100 accomplishes addition of four four-bit operands. While the concept may be applied to accomplishing addition of more than four operands, and of differing numbers of bits, the example of four four-bit operands is employed to explain the concept.

To illustrate the operation of the LAB 100, we assume that ax, bx, cx and dx are bit positions of each operand, which ax being the least significant bit. "x" indicates the operand. Thus, for example, the first operand includes the bits "a1", "b1", "c1" and "d1." Put another way, the LAB 100 enables the following addition:

$$\begin{array}{cccc} d1 & c1 & b1 & a1 \\ d2 & c2 & b2 & b2 \\ d3 & c3 & b3 & a3 \\ + \ d4 & c4 & b4 & a4 \\ \hline \end{array}$$

TOTAL

More properly, the LAB provides a sum vector and carry vector that may be added together using, for example, a ripple carry adder. When adding a large number of values together (greater than four), compression may be performed until there are only two remaining values. For example, to add fifty numbers using 4:2 compressors, there would be 26 vectors after the first compression stage (48/2+2 left over), 14 vectors after the $2^{nd}$ stage (24/2+2 left over), eight after the 3$^{rd}$ stage, four after the 4$^{th}$ stage, and two after the 5$^{th}$ stage. The last two numbers may then be added using a ripple carry adder (which, in some examples, is implemented as part of the LAB). All the compression stages may be performed by the LUT structure.

The LAB 100 includes four slices 102a through 102d. (Four slices is just an example, however.) Each slice (generically, 102) handles arithmetic pertaining to a corresponding bit position in the operands. For example, slice 102a handles arithmetic pertaining to bit position "1" in the operands. Slice 102b handles arithmetic pertaining to bit position "2" in the operands. Slice 102c handles arithmetic pertaining to bit position "3" in the operands. Finally, slice 102d handles arithmetic pertaining to bit position "4" in the operands.

Each slice 102 includes two logic cells. For example, slice 102a includes logic cells 104a1 and 104b1. Logic cell 104a1, belonging to a conceptual first stage 106-1, handles arithmetic pertaining to bit position "1" in adding the first three operands to determine an intermediate result (intermediate sum result and intermediate carry result) for bit position "1." Logic cell 104b1, belonging to a conceptual second state 106-2, handles arithmetic pertaining to bit position "1" in combining the fourth operand with the intermediate result for bit position "1" (using the intermediate carry result from the next less significant bit position which, for the least significant bit position, may be a carry-in bit CIN from a previous LAB.

Furthermore, each logic cell includes two 3-input LUT's—one for determining a "sum" bit and one for determining a "carry" bit. For example, logic cell 104a2 includes lookup table SB to determine a "sum" bit from inputs b1, b2 and b3. Logic cell 104a2 also includes lookup table CB to determine a "carry" bit from inputs b1, b2 and b3. Possible internal structures of each lookup table of the logic cells (such as lookup tables SB and CB) are known to one of ordinary skill in the art. (The designation of each lookup table is also used to designate the output from that lookup table. For example, the lookup tables designated as SB and CB output signals also designated as SB and CB, respectively.) Taking another example, then, logic cell 104b2 includes lookup table SX to determine a "sum" bit from inputs CA, SB and b4, and logic cell 104b2 also includes lookup table CX to determine a "carry" bit from inputs CA, SB and b4.

Put another way, the logic cells of the first stage 106-1 collectively perform a well-known carry-save adder function, and the logic cells of the second stage 106-2 collectively perform a well-known carry-save adder function. The first stage 106-1 and the second stage 106-2 collectively achieve a "result" of adding together the first through fourth operands. To determine the "final" sum bits, for example, a carry-propagate adder (that performs a "ripple carry") may be provided as part of the LAB or otherwise.

Figure 2:
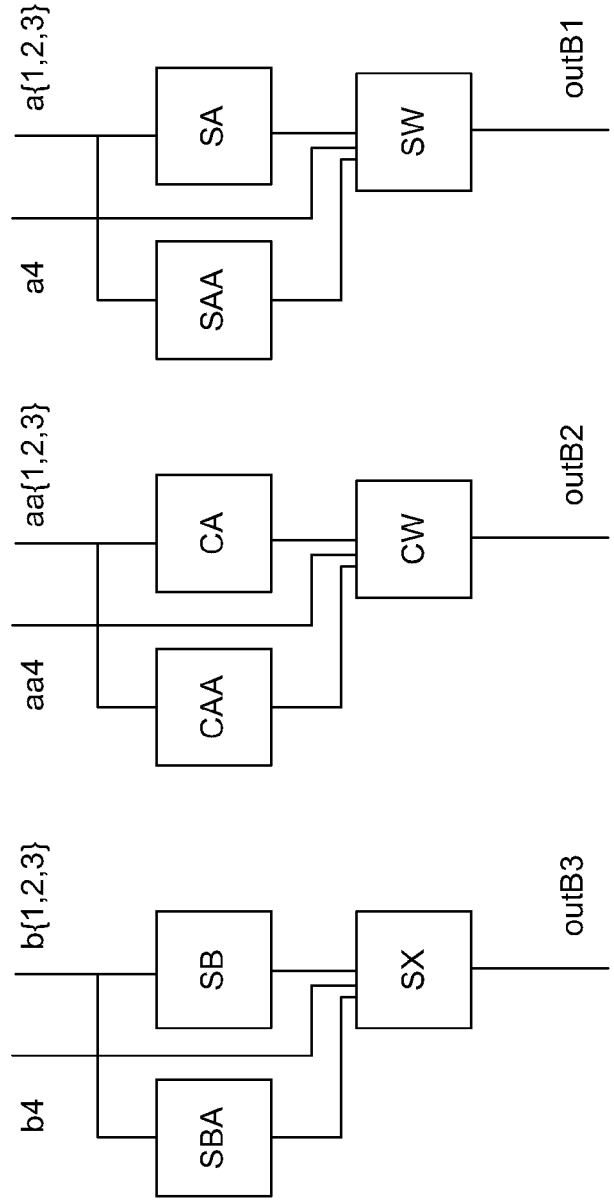
FIG. 2 illustrates an example logic array block in accordance with an aspect of the invention where the slices are configured in a "general purpose" mode.

In practice, CIN is set to "0" unless the LAB 100 is chained to a previous LAB, in which case CIN is connected to COUT of the previous LAB. FIG. 2 illustrates the FIG. 1 logic in a "general purpose" mode. The diagram of the logic has been simplified for illustrative purposes. In practice, additional features may be provided such as a register on the outputs and multiplexor and control bits internally to switch between different modes of operation.

In the FIG. 2 circuit, each half-slice implements a 4 input, 1 output LUT, made up of two 3 input LUTs (SA, SAA) with identical inputs (bits a1,a2,a3), the output of which is being selected by bit a4 using 3 input LUT SW. SA and SW are the same SA and SW as in FIG. 1. In FIG. 1 (4:2 compression), 3 input LUT SAA is not used. The wiring is slightly different between FIG. 1 and FIG. 2 (switching is performed using some multiplexing that is not shown for clarity of illustration). In FIG. 2, there are inputs into the logic (i.e., bits aa 1-4) that are not in FIG. 1.

We now explain the difference between the FIG. 1 example implementation and the FIG. 2 example implementation. In the FIG. 1 example implementation, all the input wires are independent, with different sources for each input wire. Thus, in the FIG. 1, where there are 8 LUTs (4 slices), there are sixteen independent input wires. In the FIG. 2 example, the 8 LUTs have 32 inputs. However, in practice, there are not 32 independent input wires. In a typical use, only about sixty percent of the total number of input wires are independent, since not every function requires a 4:1 ratio. If 100% independent routing was provided for the general purpose case, then the chip would be a lot bigger and less efficient.

Figure 3:
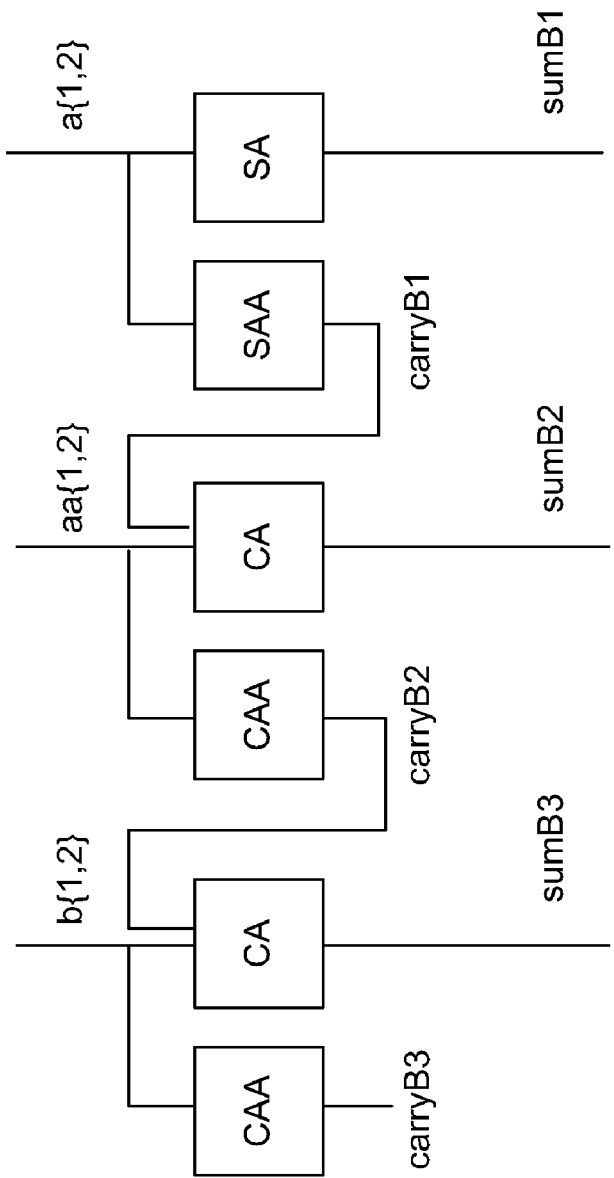
FIG. 3 illustrates an example logic array block in accordance with an aspect of the invention where the slices of the logic array block are configured in a ripple carry adder mode.

FIG. 3 illustrates the logic cells being used in ripple carry mode. Details of multiplexing to switch to this mode and sources of routing are not shown for clarity.

While the present invention has been particularly described with respect to the illustrated embodiments, it will be appreciated that various alterations, modifications and adaptations may be based on the present disclosure, and are intended to be within the scope of the present invention. While the invention has been described in connection with what are presently considered to be the most practical and preferred embodiments, it is to be understood that the present invention is not limited to the disclosed embodiment but, on the contrary, is intended to cover various modifications and equivalent arrangements included within the scope of the claims.

The invention claimed is:

1. A programmable logic device (PLD) including a plurality of logic array blocks (LAB's) connected by a PLD routing architecture, wherein at least one LAB is configured in different modes of operations to determine a compression of a plurality of N-bit numbers, the one LAB comprising:

a plurality of look-up table (LUT) logic cells, each look-up table (LUT) logic cell configured to input three operand signals at three respective inputs of that look-up table (LUT) logic cell and to output two signals at two respective outputs of that look-up table logic cell (LUT) that are a sum and carry signal resulting from adding the three operand input signals; input lines configured to receive input signals from the PLD routing architecture that represent the plurality of N-bit numbers and output lines configured to provide output signals to the PLD routing architecture that represent the compression of the plurality of N-bit numbers;

LAB internal routing logic, not part of the routing architecture of the PLD, connecting the LUT logic cells such that the LUT logic cells collectively process the input signals, received at the input lines, that represent the N-bit numbers to generate the output signals, provided at the output lines, that represent the sum of the N-bit numbers; and a register on the outputs and multiplexor and control bits internally to switch between different modes of operations, wherein the LUT logic cells are organized into slices, each of the slices performing arithmetic on a bit position of the operand signals, each slice including two of the plurality of LUT logic cells organized in a cascaded arrangement, the first logic cell in each slice performing processing of three lines receiving a first one of the bits of the N-bit numbers, and the second logic cell in each slice performing processing of three line receiving a second one of the bits of the N-bit numbers.

2. The PLD of claim 1, wherein:

each of the input lines is configured to receive one bit of one of the N-bit numbers.

3. The PLD of claim 1, wherein:

at least some of the input lines are configured to receive more than one bit of the plurality of N-bit numbers.

* * * * *